(12) United States Patent
Singh et al.

(10) Patent No.: US 9,049,140 B2
(45) Date of Patent: Jun. 2, 2015

(54) BACKBONE NETWORK WITH POLICY DRIVEN ROUTING

(75) Inventors: Abhishek Singh, Redmond, WA (US);
Ming Zhang, Redmond, WA (US);
Albert G. Greenberg, Seattle, WA (US);
Parantap Lahiri, Redmond, WA (US);
David A. Maltz, Bellevue, WA (US);
Srinivas Krishnan, Carrboro, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 12/949,402

(22) Filed: Nov. 18, 2010

(65) Prior Publication Data

US 2012/0127995 A1     May 24, 2012

(51) Int. Cl.
*H04L 12/707*     (2013.01)
*H04L 12/725*     (2013.01)
*H04L 12/801*     (2013.01)
*H04L 29/12*     (2006.01)

(52) U.S. Cl.
CPC ............... *H04L 45/22* (2013.01); *H04L 47/10* (2013.01); *H04L 61/25* (2013.01); *H04L 45/302* (2013.01)

(58) Field of Classification Search
None
See application file for complete search history.

(56) References Cited

U.S. PATENT DOCUMENTS 6,542,934 B1 * 4/2003 Bader et al. .................. 709/239
6,981,055 B1 * 12/2005 Ahuja et al. .................. 709/238
2001/0050914 A1 * 12/2001 Akahane et al. ............... 370/382
2004/0039839 A1 * 2/2004 Kalyanaraman et al. ...... 709/238
2005/0025143 A1 * 2/2005 Chen et al. .................... 370/389
2006/0029035 A1 * 2/2006 Chase et al. ................... 370/351
2007/0086362 A1 * 4/2007 Kato et al. ..................... 370/254
2007/0214275 A1    9/2007 Mirtorabi et al.
2008/0317056 A1   12/2008 Curtis et al.
2009/0089438 A1 * 4/2009 Agarwal et al. ............... 709/228

(Continued)

FOREIGN PATENT DOCUMENTS

CN     101044728     9/2007
CN     101394333     3/2009

OTHER PUBLICATIONS

Joseph, et al., "A Policy-aware Switching Layer for Data Centers", Retrieved at << http://citeseerx.ist.psu.edu/viewdoc/download?doi=10.1.1.141.5101&rep=rep1&type=pdf >>, Technical Report, No. UCB/EECS-2008-82, Jun. 24, 2008, pp. 26.

(Continued)

*Primary Examiner* — Nicholas Sloms
(74) *Attorney, Agent, or Firm* — Ladislav Kusnyer; Judy Yee; Micky Minhas

(57) ABSTRACT

A source device obtains a data packet that includes both a destination address and a payload. The source device selects an exit point address of multiple exit point addresses corresponding to the destination address based on one or more policies. The source device encapsulates the data packet with a header that includes the selected exit point address, and the encapsulated data packet is provided to the backbone network. The encapsulated data packet is routed through the backbone network based on the exit point address, and an edge router of the backbone network identifies an interface of the edge router that corresponds to the exit point address. The header is removed from the encapsulated data packet, and the data packet is added to a buffer of the interface for routing to one or more other devices outside of the backbone network.

20 Claims, 7 Drawing Sheets

(56) References Cited

U.S. PATENT DOCUMENTS

2010/0061391 A1 3/2010 Sindhu et al.
2010/0153523 A1 6/2010 Li et al.

OTHER PUBLICATIONS

Pelley, et al., "Power Routing: Dynamic Power Provisioning in the Data Center", Retrieved at << http://www.eecs.umich.edu/~spelley/Publications/Pelley-ASPLOS2010-PowerRouting.pdf >>, Proceedings of the 15th International Conference on Architectural Support for Programming Languages and Operating Systems, ASPLOS, Mar. 13-17, 2010, pp. 12.

"Integrating Application Delivery Solutions into Data Center Infrastructure", Retrieved at << http://www.ciscocatalyst.info/en/US/prod/collateral/modules/ps2706/ps6906/White_Paper_Integrating_Application_Delivery_Solutions_into_Data_Center_Infrastructure.pdf >>, White Paper, pp. 13.

"The Brocade DCX Backbone and the Evolving Data Center", Retrieved at << http://www.brocade.com/downloads/documents/technical_briefs/DCX_Vision_GA-TB-063-02.pdf >>, pp. 1-11.

Nispel, Markus., "The Virtual Data Center Solution", Retrieved at << http://secure.enterasys.com/de/products/whitepapers/virtual_dc_eng.pdf >>, White paper, pp. 1-15.

"The Locator Identifier Separation Protocol (LISP)", *The Internet Protocol Journal*, vol. 11, No. 1, Retrieved from <http://www.cisco.com/web/about/ac123/ac147/archived_issues/ipj_11-1/ipj_11-1.pdf>,(Mar. 2008), 44 pages.

"Foreign Office Action", CN Application No. 201110386175.7, Jun. 13, 2014, 11 pages.

"Foreign Office Action", CN Application No. 201110386175.7, Nov. 21, 2013, 14 Pages.

* cited by examiner

BACKBONE NETWORK WITH POLICY DRIVEN ROUTING

BACKGROUND

When a source device desires to send a data packet to a target device through a particular network, such as a data center backbone, the source device provides the data packet to the network. The data packet is routed through the network, exiting the network at a device that continues routing the data packet to the target device. While such networks can be beneficial in transmitting the data packet from the source device to the target device, they are not without their problems. One such problem is that there is typically a single path in the network through which packets from a particular source device to a particular target device are routed, which reduces the flexibility of the network. Another such problem is that, in order for a router in the network to transmit a received packet to the correct next router in the network, the routers in the network typically store mappings for each possible target device address (or target device address prefix). The number of mappings such router devices store can become very large, increasing the cost of such router devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a data packet that includes both a destination address and a payload is obtained. An exit point address of multiple exit point addresses corresponding to the destination address is identified. Each of the multiple exit point addresses is associated with one or more interfaces of one or more edge routers of a backbone network, and each of the one or more edge routers provides data packets from the backbone network to one or more other devices. The data packet is encapsulated with a header that includes the exit point address, and the encapsulated data packet is provided to the backbone network.

In accordance with one or more aspects, in an edge router of a backbone network, an encapsulated data packet is received. The encapsulated data packet has a first header that includes an exit point address and a second header that includes a destination address. An interface of the edge router that corresponds to the exit point address is identified based on the exit point address. The first header is removed from the encapsulated data packet, and the data packet is added to a buffer of the interface.

BRIEF DESCRIPTION OF THE DRAWINGS

The same numbers are used throughout the drawings to reference like features.

DETAILED DESCRIPTION

A backbone network with policy driven routing is discussed herein. A source device desiring to send a data packet to a target device through a backbone network obtains the data packet including both the data to be sent (referred to as the payload) and a destination address of the target device. The source device accesses a controller device that maintains a mapping of destination address prefixes to exit point addresses. The exit point addresses correspond to different interfaces of one or more different edge routers of the backbone network from which the data packet could potentially exit the backbone network. One of the exit point addresses is selected for the data packet based on various criteria (e.g., performance of the different interfaces, cost of using the different interfaces, etc.). The data packet is encapsulated with the selected exit point address, and routed through the backbone network based on the selected exit point address. Upon reaching the edge router that includes the interface having the selected exit point address, the exit point address is removed from the encapsulated data packet, and the resulting data packet is forwarded on to another device to continue towards the target device.

Additionally, the backbone network typically includes multiple routers. Each router in the backbone network maintains a routing table that maps each exit point address to a next router in the backbone network in a path to the edge router that includes the interface having that exit point address. Upon receiving a data packet, a router in the backbone network determines the next router in the path to the edge router for that packet using the exit point address in the encapsulated data packet rather than the destination address.

Figure 1:
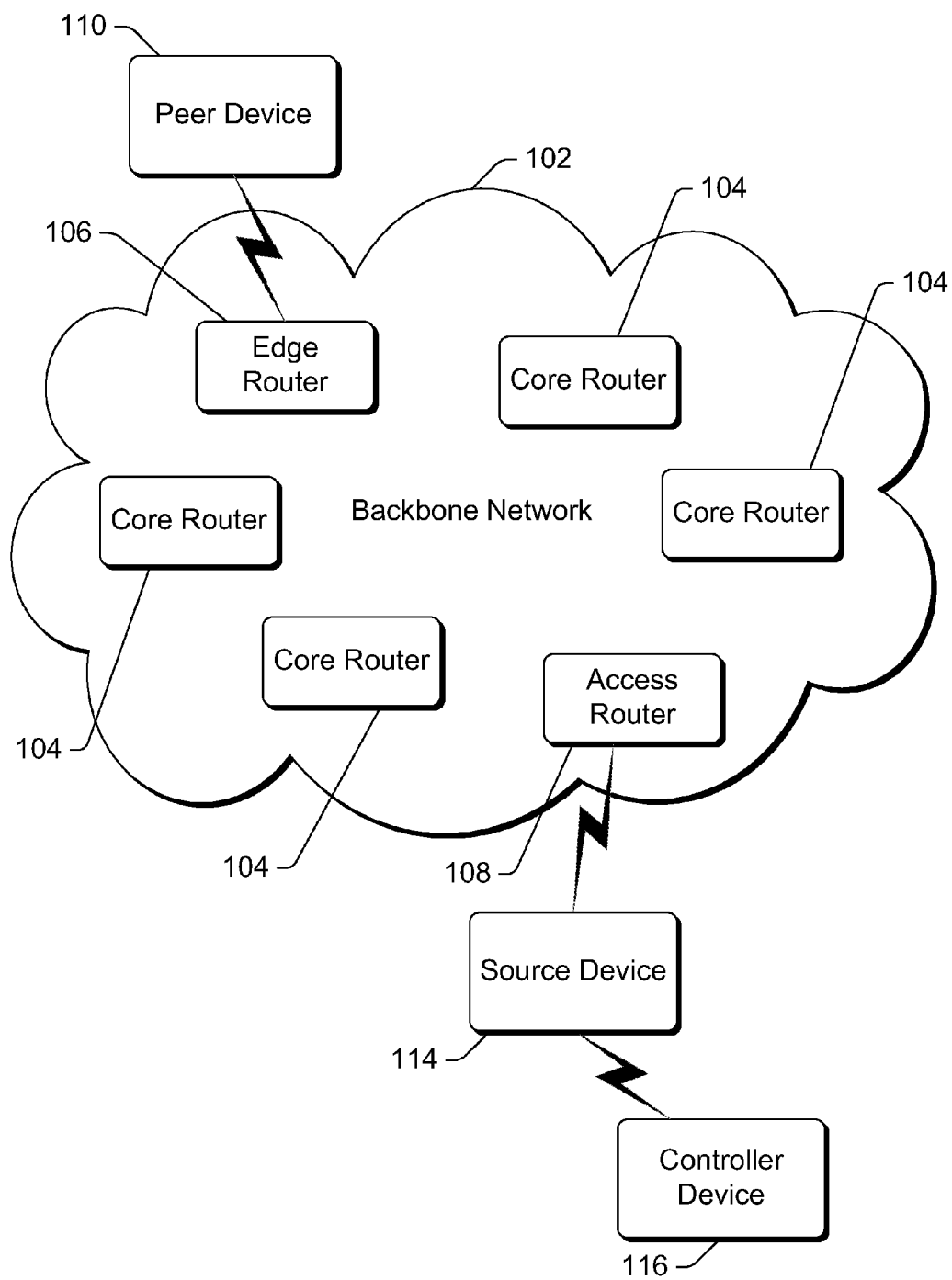
FIG. 1 illustrates an example system implementing the backbone network with policy driven routing in accordance with one or more embodiments.

FIG. 1 illustrates an example system 100 implementing the backbone network with policy driven routing in accordance with one or more embodiments. System 100 includes a backbone network 102 including multiple routers 104, 106, and 108. Backbone network 102 is a network that is managed and used by a particular entity to route data packets among various devices used by that entity. Backbone network 102 is oftentimes managed by a particular company or organization for interconnecting devices used by that company or organization, or to provide a service. For example, backbone network 102 can be a network of a data center that provides various services (e.g., data storage, email functionality, social networking functionality, and so forth) to other computing devices.

Backbone network 102 includes multiple core routers 104, multiple edge routers 106, and multiple access routers 108. Core routers 104 receive data packets from other routers in backbone network 102 and transmit those received data packets to other routers in backbone network 102. Access routers 108 receive data packets from source devices (e.g., in data centers) and transmit those received data packets to other routers in backbone network 102. Edge routers 106 receive data from other routers in backbone network 102 and transmit those received data packets to another device outside of backbone network 102 (e.g., a peer device 110). For example, edge router 106 can transmit received data packets to peer device 110. Peer devices 110 can be computing devices, or alternatively other network devices (e.g., routers, gateways, etc.) that are coupled to other networks (e.g., other backbone networks, the Internet, etc.).

Routers within backbone network 102 can communicate data packets to one another using a variety of different conventional wired and/or wireless couplings or connections. Similarly, edge routers 106 can communicate with peer devices outside of backbone network 102 using a variety of different conventional wired and/or wireless couplings or connections.

Data packets are provided to backbone network 102 by a source device 114. Source device 114 is a computing device that originates a data packet from the perspective of backbone network 102. Source device 114 can obtain the data packet in different manners. For example, source device 114 can generate the data packet, or alternatively can receive the data packet from another device (e.g., access routers or other source devices in the data center, and so forth).

The data packet provided by source device 114 includes a network address of the device that is to ultimately receive the data packet, which is also referred to as the target device or the intended target of the data packet. The network address of the target device is also referred to as the destination address for the data packet. The data packet also includes an exit point address, which is a network address of an interface of an edge router of backbone network 102 at which the data packet is to exit or leave backbone network 102. As this interface of the edge router is the point at which the data packet is to exit or leave backbone network 102, this interface can also be referred to as an exit point (of backbone network 102).

The interface of an edge router can be, for example, a port or other communication mechanism linking the edge router to a particular peer device. A single edge router can include multiple different interfaces. Alternatively, an edge router may include a single interface, in which case the exit point address also refers to the address of the edge router.

Source device 114 determines the exit point address for a data packet based at least in part on communications with a controller device 116. Controller device 116 maintains a mapping of destination addresses and corresponding exit point addresses. This mapping maintained by controller device 116 and the selection of an exit point address are discussed in more detail below.

Source device 114 provides data packets to backbone network 102, typically by transmitting the data packets to an interface of an access router (access router 108 in the example of FIG. 1). In one or more embodiments, source device 114 is managed and used by the same entity as backbone network 102. For example, source device 114 can be a server device in the same data center as backbone network 102, providing various services (e.g., data storage, email functionality, social networking functionality, and so forth) to other computing devices.

System 100 is illustrated using only a few core routers 104, an edge router 106, an access router 108, a peer device 110, a source device 114 and a controller device 116. However, it is to be appreciated that backbone network 102 can include any number of core routers, any number of access routers, and any number of edge routers. It is also to be appreciated that edge routers can be coupled to any number of peer devices, any number of source devices can be coupled to access routers, and that any number of controller devices can be used.

Generally, data packets are obtained by source device 114 and provided to an access router of backbone network 102. Each data packet includes an exit point address, and the data packet is transmitted between various routers based on the exit point address until the data packet arrives at the edge router that includes the interface having the exit point address. The edge router removes the exit point address from the data packet and transmits the data packet to the peer device coupled to that interface of the edge router. The peer device then proceeds with forwarding the data packet on to the next appropriate device based on the destination address in the data packet.

Figure 2:
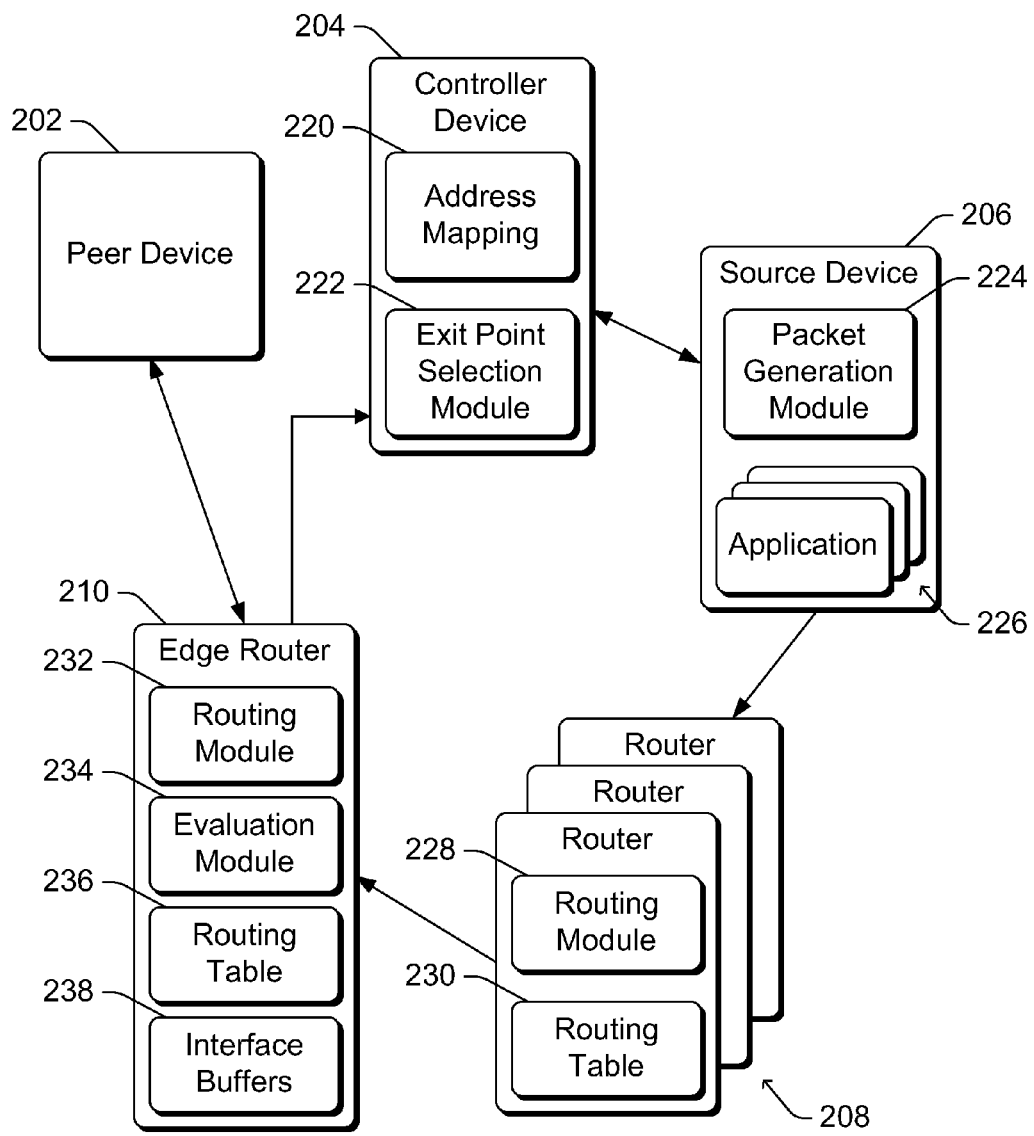
FIG. 2 illustrates an example system using the backbone network with policy driven routing in accordance with one or more embodiments.

FIG. 2 illustrates an example system 200 using the backbone network with policy driven routing in accordance with one or more embodiments. System 200 includes a peer device 202, a controller device 204, a source device 206, multiple routers 208, and an edge router 210. Peer device 202 is, for example, a peer device 110 of FIG. 1. Controller device 204 is, for example, a controller device 116 of FIG. 1. Source device 206 is, for example, a source device 114 of FIG. 1. Each router 208 is, for example, a core router 104 or an access router 108 of FIG. 1. Edge router 210 is, for example, an edge router 106 of FIG. 1.

Controller device 204 includes an address mapping 220 and an exit point selection module 222. Address mapping 220 is a database or other record of exit point addresses and corresponding destination addresses. These exit point addresses and destination addresses are network addresses and can be, for example, Internet Protocol (IP) addresses (e.g., Internet Protocol version 4 (IPv4) or Internet Protocol version 6 (IPv6) addresses). The exit point addresses and destination addresses are typically both the same type of network addresses (e.g., IPv4 addresses), but alternatively can be different types of addresses. Multiple different destination addresses can correspond to the same exit point address, and a single destination address can correspond to multiple different exit point addresses.

In one or more embodiments, the destination addresses are represented in address mapping 220 by their respective address prefixes. The address prefixes are a particular number of bits of the beginning of a network address, such as the first 18 bits. In such embodiments, address mapping 220 maps address prefixes to exit point addresses.

The exit point address or addresses that correspond to a particular destination address prefix can be obtained by controller device 204 in a variety of different manners. In one or more embodiments, the edge routers 210 provide to controller device 204 indications of the destination address prefixes that are learned by those edge routers as well as one or more exit point addresses corresponding to each of those destination address prefixes. Thus, for destination address prefixes that are learned by edge router 210, edge router 210 provides to controller device 204 an indication of the destination address prefixes that are learned by edge router 210 as well as one or more exit point addresses for each of the destination address prefixes that are owned by edge router 210. A destination address prefix being owned by a particular edge router refers to that particular edge router accepting responsibility for forwarding data packets having a destination address with that destination address prefix to the correct target device having that destination address.

Alternatively, the exit point address or addresses that correspond to a particular destination address prefix can be obtained by controller device 204 in other manners. For example, controller device 204 can receive an indication of the exit point address or addresses that correspond to a particular destination address prefix from another controller device, from a different edge router, from some other device, and so forth.

Address mapping 220 thus identifies, for each possible destination address prefix, a corresponding one or more exit point addresses. Each exit point address corresponds to an interface of an edge router, and each interface typically corresponds to a single exit point address. Thus, address mapping 220 allows one or more interfaces (of one or more edge routers of a backbone network) that correspond to a particular destination address prefix to be identified given a particular destination address or destination address prefix.

Different exit points can have different characteristics, such as different latencies, different bandwidth capabilities, different costs, different security characteristics and so forth. As a destination address prefix can, and typically does, correspond to multiple different exit points, the characteristics of these different exit points can be used to determine which particular exit point a particular data packet is to use.

The characteristics of a particular exit point can be maintained by controller device 204 as part of the database or record that is address mapping 220, or alternatively a separate database or record of these characteristics can be maintained by controller device 204. These characteristics of a particular exit point can be identified by controller device 204 in a variety of different manners. For example, controller device 204 can be pre-configured with one or more of these characteristics, can obtain one or more of these characteristics from another device, and so forth.

In one or more embodiments, a monitor in the backbone network monitors various characteristics of the exit points of the backbone network. This monitor can be a separate device within the backbone network and/or a module of the edge routers. The monitor determines various performance characteristics, such as latency and available bandwidth for each exit point at regular or irregular intervals. Latency and available bandwidth for a particular exit point can be determined in different manners, such as by sending test data packets to the exit point, by querying a control module of the exit point for latency and available bandwidth at the exit point, by using other conventional latency and bandwidth probing tools, and so forth. The information (such as latency and available bandwidth) obtained by the monitor for the exit points is returned to controller device 204 at regular or irregular intervals (e.g., approximately hourly).

Additionally, in one or more embodiments controller device 204 is configured with (or obtains from another device) information identifying a cost of using each of the exit points. This cost refers to a cost in terms of some currency (e.g., U.S. dollars) of using the exit point, such as a particular cost per data packet or per byte. The cost is, for example, an amount charged by an entity owning or controlling a peer device coupled to a particular exit point. The information identifying the cost of using an exit point is maintained by controller device as a characteristic of that exit point.

Furthermore, in one or more embodiments controller device 204 is configured with (or obtains from another device) information identifying security characteristics of each of the exit points. The security characteristics of an exit point include various information related to the security provided by the exit point and/or peer device receiving data packets from the exit point. The security characteristics of an exit point can include, for example, an indication of whether the exit point is known (e.g., by controller 204, by an administrator or user of system 200, etc.) to be trusted or not trusted, whether a peer device 202 receiving packets from an exit point is known (e.g., by controller 204, by an administrator or user of system 200, etc.) to be trusted or not trusted, encryption and/or decryption (if any) used by the peer device 202 receiving packets from an exit point, and so forth.

Exit point selection module 222 applies one or more policies to select, based on the characteristics of the various exit points, a particular one of the exit points that a particular data packet is to use. The one or more policies refer to rules, algorithms, and so forth followed by exit point selection module 222 in selecting an exit point that a particular data packet is to use. In one or more embodiments, exit point selection module 222 receives from source device 206 a request for an exit point address, and in response exit point selection module 222 selects an exit point and returns the address of the selected exit point to source device 206. In such embodiments, source device 206 includes as part of the request to exit point selection module 222 at least the destination address prefix (the entire destination address can optionally be included), and can optionally include one or more criteria source device 206 desires to be satisfied.

Exit point selection module 222 can apply various policies in selecting a particular exit point for a data packet to use. Additionally, these policies can change over time allowing, for example, an administrator of system 200 to modify policies as they desire. In one or more embodiments, exit point selection module 222 applies a policy of satisfying the one or more criteria received from source device 206. In such embodiments, exit point selection module 222 identifies a set of one or more exit point addresses that correspond to the destination address prefix received from source device 206. Exit point selection module 222 then identifies a subset of that set of exist point addresses that are the addresses of exit points that satisfy the one or more criteria received from source device 206.

Whether an exit point satisfies particular criteria received from source device 206 can be determined in different manners based on the particular criteria. For example, if the criteria indicates that latency is to be less than 30 ms, then an exit point satisfies that criteria if the latency characteristic of the exit point is a latency of less than 30 ms. By way of another example, if the criteria indicates that available bandwidth is to be at least 2 megabits per second, then an exit point satisfies that criteria if the available bandwidth characteristic of the exit point is 2 or more megabits per second.

In situations in which no exit points satisfy the one or more criteria received from source device 206, an indication that no exit points satisfy the criteria can be returned to source device 206 rather than an exit point address. Alternatively, exit point selection module 222 can identify, as the subset of exit point addresses, one or more addresses of exit points that are closest to satisfying the criteria. For example, if the criteria indicate that latency is to be less than 30 ms, and no exit points have a latency of less than 30 ms, then the exit point having the lowest latency can be identified as the exit point whose address is included in the subset.

Additionally, in one or more embodiments exit point selection module 222 applies a policy of selecting an exit point having a lowest cost. The costs of using different exit points can be characteristics of the exit points as discussed above. Accordingly, exit point selection module 222 can apply a policy of selecting the exit point that has the lowest cost (e.g., lowest cost per data packet, lowest cost per byte, etc.).

Furthermore, exit point selection module 222 can apply a policy of both satisfying multiple criteria, such as the one or more criteria received from source device 206 and selecting the exit point having the lowest cost. For example, exit point selection module 222 can identify a subset of exit points that satisfy the criteria received from source device 206. The exit point in this subset that has the lowest cost can then be selected as the exit point to whose address is to be returned to source device 206.

It should be noted that various other policies can be employed by exit point selection module 222 depending on the desires of an administrator or user of controller device 204, the desires of an administrator or user of source device 206, and so forth. For example, different algorithms or sets of rules can be developed that take into account different characteristics of exit points, that weigh different characteristics of exit points differently (e.g., having a low cost may be weighed heavier than having a low latency), and so forth.

In one or more embodiments, controller device 204 returns a single exit point address to source device 206 in response to a request for an exit point address. In situations in which exit point selection module 222 determines that multiple exit points could be returned in accordance with the policy being followed by module 222, the address of one of those multiple exit points is selected as the address to be returned. This one to be returned can be selected in different manners, such as randomly, based on the criteria (e.g., if the criteria is to have a latency of less than 30 ms, then the address of the exit point having the lowest latency can be selected), based on cost (e.g., the address of the exit point having the lowest cost is selected), according to some other rules or criteria, and so forth.

In other embodiments, controller device 204 returns two or more exit point addresses to source device 206 in response to a request for an exit point address. One of the exit point addresses returned is the exit point address selected as discussed above, and one or more additional exit point addresses that are returned are backup exit point addresses. These one or more backup exit point addresses can be used by source device 206 in the event that sending a data packet using the selected exit point address is unsuccessful. The backup exit point address (or addresses) can be selected from those exit point addresses that the policy indicates could be returned in different manners, such as randomly, based on the criteria (e.g., if the criteria is to have a latency of less than 30 ms, then the address of the exit point having the next lowest latency (other than the address of selected exit point)), according to some other rules or criteria, and so forth.

Additionally, in one or more embodiments controller device 204 authenticates source device 206 to verify that source device 206 is trusted by controller device 204. A variety of different authentication techniques can be used, such as source device 206 providing a proper combination of source device identifier and password, source device 206 providing a digital certificate issued by controller device 204 or some other trusted authority, source device 206 encrypting data using a private key of source device 206 (and which controller device 204 can decrypt using a known public key of source device 206), and so forth. This verification allows controller device 204 to allow only source devices 206 that are trusted by controller device 204 to receive exit point addresses, and thus effectively restrict which source devices 206 can have access to routers 208.

Source device 206 includes a packet generation module 224 and one or more applications 226. Although packet generation module 224 is illustrated as being separate from applications 226, packet generation module 224 can alternatively be implemented as part of applications 226.

Packet generation module 224 generates an encapsulated data packet in response to a request from an application 226. The request from the application 226 includes the destination address for the data packet, and optionally one or more criteria to be used in selecting the exit point for the data packet. The encapsulated data packet includes a payload, an inner header, and an outer header. The payload refers to the data to be sent in the encapsulated data packet, and can optionally be empty. The inner header includes the destination address, and optionally other control information. The outer header includes the exit point address for the encapsulated data packet, and optionally other control information.

Packet generation module 224 obtains a data packet (having an inner header and a payload) from which module 224 generates the encapsulated data packet. Packet generation module 224 can obtain the data packet by generating the packet from scratch (e.g., a data packet including the destination address and payload did not previously exist), such as by obtaining data and a destination address from an application 226. Packet generation module 224 can also obtain the data packet from another device or component, such as a data packet received by an application 226 from another network or device.

Figure 3:
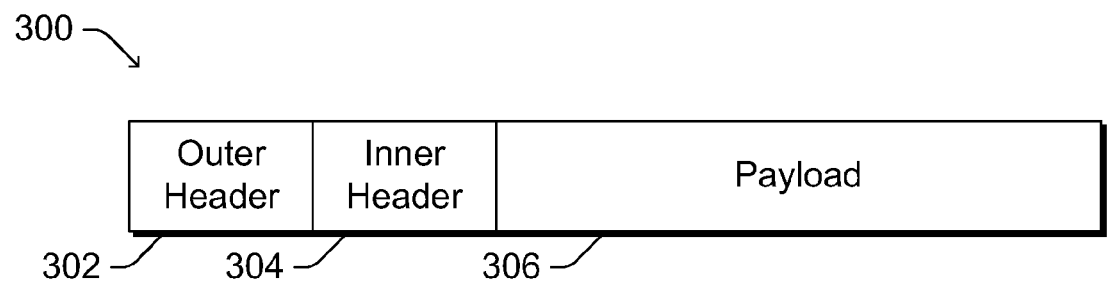
FIG. 3 illustrates an example encapsulated data packet in accordance with one or more embodiments.

FIG. 3 illustrates an example encapsulated data packet 300 in accordance with one or more embodiments. Data packet 300 includes an outer header portion 302, an inner header portion 304, and a payload portion 306. Outer header portion 302 includes the exit point address for the data packet, inner header portion 304 includes the destination address, and payload portion 306 includes the payload of the data packet.

It should be noted that encapsulated data packet 300 is an example encapsulated data packet, and that other data packet formats can alternatively be used. For example, if routers 208 and 210 of FIG. 2 were configured to route data packets based on addresses in locations other than outer header 302, the exit point address for the data packet could be included elsewhere in the encapsulated data packet.

Returning to FIG. 2, to generate an encapsulated data packet, packet generation module 224 sends a request to controller device 204 for an exit point address corresponding to a destination address (or destination address prefix). Various other criteria can also be included in the request, as discussed above. The particular criteria to include in the request can be identified by packet generation module 224 in different manners, such as being pre-configured in packet generation module 224, being received by packet generation module 224 from an application 226, and so forth. Packet generation module 224 receives an exit point address from exit point selection module 222, and includes the exit point address in the outer header of the data packet. This use of the outer header serves to encapsulate the data packet, allowing the routers 208 to use the exit point address rather than the destination address as discussed in more detail below.

It should be noted that different applications 226 can provide different criteria for exit point selection. Accordingly, exit point selection module 222 can select different exit points for data packets from different applications 226 on the same source device 206 sending data packets to the same destination address.

It should also be noted that packet generation module 224 need not access controller device 204 for each encapsulated data packet that module 224 generates. For example, packet generation module 224 can maintain a cache of destination addresses (or destination address prefixes) corresponding to particular exit point addresses for each application 226. For each encapsulated data packet being generated by packet generation module 224 for an application 226 having a destination address (or destination address prefix) in the cache for that application 226, packet generation module 224 uses the cached exit point address.

In situations in which packet generation module 224 receives a single exit point address from exit point selection module 222, packet generation module 224 includes that single exit point address in the outer header of the encapsulated data packet. In situations in which packet generation module 224 receives multiple exit point addresses from exit point selection module 222, packet generation module 224 includes in the outer header of the encapsulated data packet the exit point address indicated by exit point selection module 222 as the selected exit point address. Packet generation module 224 maintains a record of the one or more backup exit point addresses and includes one of the backup exit point addresses in the outer header of the encapsulated data packet if sending the encapsulated data packet with the selected exit point address is unsuccessful (e.g., the exit point is not functioning properly, an indication that a data packet including the selected exit point address has been dropped is returned to source device 206, etc.). Alternatively, packet generation module 224 can include one or more of the backup exit point addresses in the outer header of the encapsulated data packet, and a backup exit point address can be used by a router 208 if sending the encapsulated data packet with the selected exit point address is unsuccessful (e.g., the next router in the path to the selected exit point has lost power or otherwise become non-operational, the exit point is not functioning properly, etc.).

In the discussions above, exit point selection module 222 is illustrated as being included in controller device 204. Alternatively, exit point selection module 222 can be included in source device 206. In such situations, source device 206 can request from controller device 204 an indication of particular exit point addresses (and characteristics of the corresponding exit points) that are mapped to a particular destination address prefix (or destination address). Source device 206 can then apply a particular policy to select one of the exit point addresses. In other alternatives, address mapping 220 can be maintained by the individual source devices 206, in which case controller device 204 need not maintain address mapping 220.

The encapsulated data packet generated by source device 206 is provided to a router 208 of the backbone network. The encapsulated data packet can be routed through a path including multiple different routers 208 within the backbone network. One or more routes (also referred to as paths) through the backbone network are identified, each route being from an entry point into the backbone network (e.g., an access router at which a data packet can be provided to the backbone network) to an exit point of the backbone network. These routes can be identified in a variety of different conventional manners. For example, a central control module or device can determine the routes through the backbone network, each individual router can determine at least part of a route through the network (and change that route in response to a router losing power or becoming non-operational), and so forth.

Each router 208 includes a routing module 228 and a routing table 230. Routing table 230 includes a mapping of exit point addresses to routers. This mapping in routing table 230 is a portion of a route through the backbone network. Regardless of the manner in which the routes are identified, each router 208 maintains in routing table 230 an indication of the next router in the path towards each exit point address. Accordingly, the mapping in routing table 230 is a mapping of an exit point address to the next router in the path towards that exit point address. Each router 208 need not have (but alternatively can have) knowledge of the entire route through the backbone network.

Routing module 228 receives encapsulated data packets (e.g., from another router or a source device), and identifies the exit point address in the outer header of each encapsulated data packet. For each encapsulated data packet, routing module 228 determines, based on routing table 230, the next router 208 or 210 in the path towards the exit point having that exit point address. Routing module 228 then forwards the encapsulated data packet to the next router in the path towards the exit point having that exit point address.

In one or more embodiments, the encapsulated data packet includes one or more backup exit point addresses as discussed above. In such embodiments, routing module 228 can also perform re-routing of encapsulated data packets towards a backup exit point address if using the selected exit point address is unsuccessful. For example, if routing module 228 determines that the next router in the path to the selected exit point address has lost power or has otherwise become non-operational, routing module 228 can select a backup exit point address, replace the previously selected exit point address with the backup exit point address, and forward the encapsulated data packet to the next router in the path towards the exit point having that selected backup exit point address.

Eventually, the encapsulated data packet is received at edge router 210. Edge router 210 includes a routing module 232, evaluation module 234, routing table 236, and one or more interface buffers 238. Routing table 236 includes a mapping of exit point addresses to interfaces of edge router 210. This mapping in routing table 236 is a portion of a route through the backbone network. Analogous to routers 208 discussed above, edge router 210 need not have (but alternatively can have) knowledge of the entire route through the backbone network.

Edge router 210 has one or more interfaces, each interface having a corresponding interface buffer 238. Each interface has an associated network address (an exit point address), and the mapping of routing table 236 is a mapping of exit point addresses to particular interfaces (and corresponding interface buffers 238) included in edge router 210. The exit point addresses corresponding to the different interfaces can be identified in different manners (e.g., an indication of the exit point addresses corresponding to the different interfaces being configured by network operators, being configured by an administrator or user of system 200, etc.).

When edge router 210 receives an encapsulated data packet from a router 208, evaluation module 234 identifies the exit point address in the outer header of the encapsulated data packet. Evaluation module 234 determines, based on routing table 236, whether edge router 210 has an interface corresponding to that exit point address. Evaluation module 234 also informs routing module 232 whether edge router 210 has an interface corresponding to that exit point address.

Routing module 232 handles the encapsulated data packet in different manners depending on whether edge router 210 has an interface corresponding to that exit point address. If edge router 210 does not have an interface corresponding to that exit point address, then routing module 232 drops the encapsulated data packet. Dropping the encapsulated data packet refers to deleting or otherwise ignoring the encapsulated data packet. A message indicating that the encapsulated data packet has been dropped can optionally be communicated to a device in the backbone network, or returned to the source device (e.g., if an address of the source device is included in the encapsulated data packet or is otherwise available to edge router 210).

However, if edge router 210 does have an interface corresponding to that exit point address, then routing module 232 adds the data packet to the interface buffer 238 corresponding to the interface corresponding to that exit point address. In one or more embodiments, routing module 232 removes the outer header from the encapsulated data packet prior to adding the data packet to the interface buffer 238. In such embodiments, the de-encapsulated data packet (the data packet with the inner header and payload) is added to the interface buffer 238. In other embodiments, the encapsulated data packet is added to the interface buffer 238. The data packet is de-encapsulated (the outer header is removed) prior to forwarding the data packet to peer device 202.

Eventually, the data packet in the interface buffer 238 is communicated to peer device 202. A control module associated with the interface buffer 238 can determine when to send the data packet, such as in accordance with a particular timing protocol, in response to a request from peer device 202, and so forth. Data packets in the interface buffer 238 can be communicated to peer device 202 in a first-in-first-out manner, or alternatively in accordance with other protocols or rules.

Upon receiving the data packet, peer device 202 proceeds with forwarding the data packet to the target device based on the destination address. It should be noted that the data packet received by peer device 202 is the de-encapsulated data packet—the outer header that includes the exit point address is removed prior to the data packet being communicated to peer device 202.

Thus, it can be seen that the techniques discussed herein allow different exit points from the backbone network to be used for different data packets even if those different data packets have the same destination address. Different routes or paths through the backbone network can be used, each of which results in a data packet exiting the backbone network at a different exit point. The particular exit point selected for a data packet varies based on the policy used by exit point selection module 222 as discussed above, and thus the route through the backbone network for the data packet is driven by the policy used by exit point selection module 222.

It should also be noted that, as discussed above, routers 208 maintain mappings of exit point addresses to routers, and edge router 210 maintains a mapping of exit point addresses to interfaces. The mappings maintained by routers 208 and 210 are based on exit point addresses, not destination addresses. Oftentimes, there are many more possible destination addresses than there are exit point addresses. For example, for data packets passed through a backbone network, the data packets may have one of on the order of a few hundred thousand different destination addresses, but one of only approximately one thousand different exit point addresses. Accordingly, the backbone network with policy driven routing techniques discussed herein greatly reduces the number of addresses for which mappings are maintained by routers 208 and 210. This allows, for example, lower cost general purpose or commodity routers to be used as routers 208 and 210 rather than more expensive specialized routers capable of mapping the large numbers of possible destination addresses.

Figure 4:
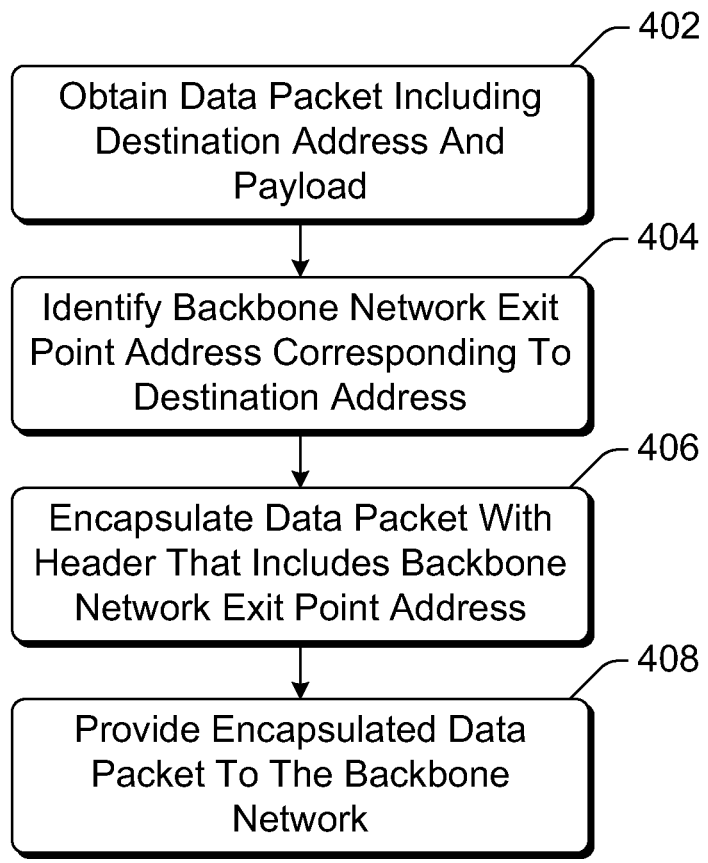
FIG. 4 is a flowchart illustrating an example process for a source device implementing the backbone network with policy driven routing in accordance with one or more embodiments.

FIG. 4 is a flowchart illustrating an example process 400 for a source device implementing the backbone network with policy driven routing in accordance with one or more embodiments. Process 400 is carried out by a source device, such as a source device 114 of FIG. 1 or a source device 206 of FIG. 2, and can be implemented in software, firmware, hardware, or combinations thereof. Process 400 is shown as a set of acts and is not limited to the order shown for performing the operations of the various acts. Process 400 is an example process for a source device implementing the backbone network with policy driven routing; additional discussions of a source device implementing the backbone network with policy driven routing are included herein with reference to different figures.

In process 400, a data packet including a destination address and a payload is obtained (act 402). The destination address is the network address (e.g., IP address) of a target device of the data packet. In act 402, the data packet can be generated by, or alternatively received by, the source device implementing process 400.

A backbone network exit point address corresponding to the destination address is identified (act 404). The exit point address is identified based on one or more different policies as discussed above. The exit point address identified in act 404 can be selected by the source device implementing process 400, or alternatively by a controller device as discussed above.

The data packet is encapsulated with a header that includes the backbone network exit point address (act 406). The backbone network exit point address is the exit point address identified in act 402.

The encapsulated data packet is provided to the backbone network (act 408). The encapsulated data packet can be provided to the backbone network in different manners, such as by being provided to an access router as discussed above.

Figure 5:
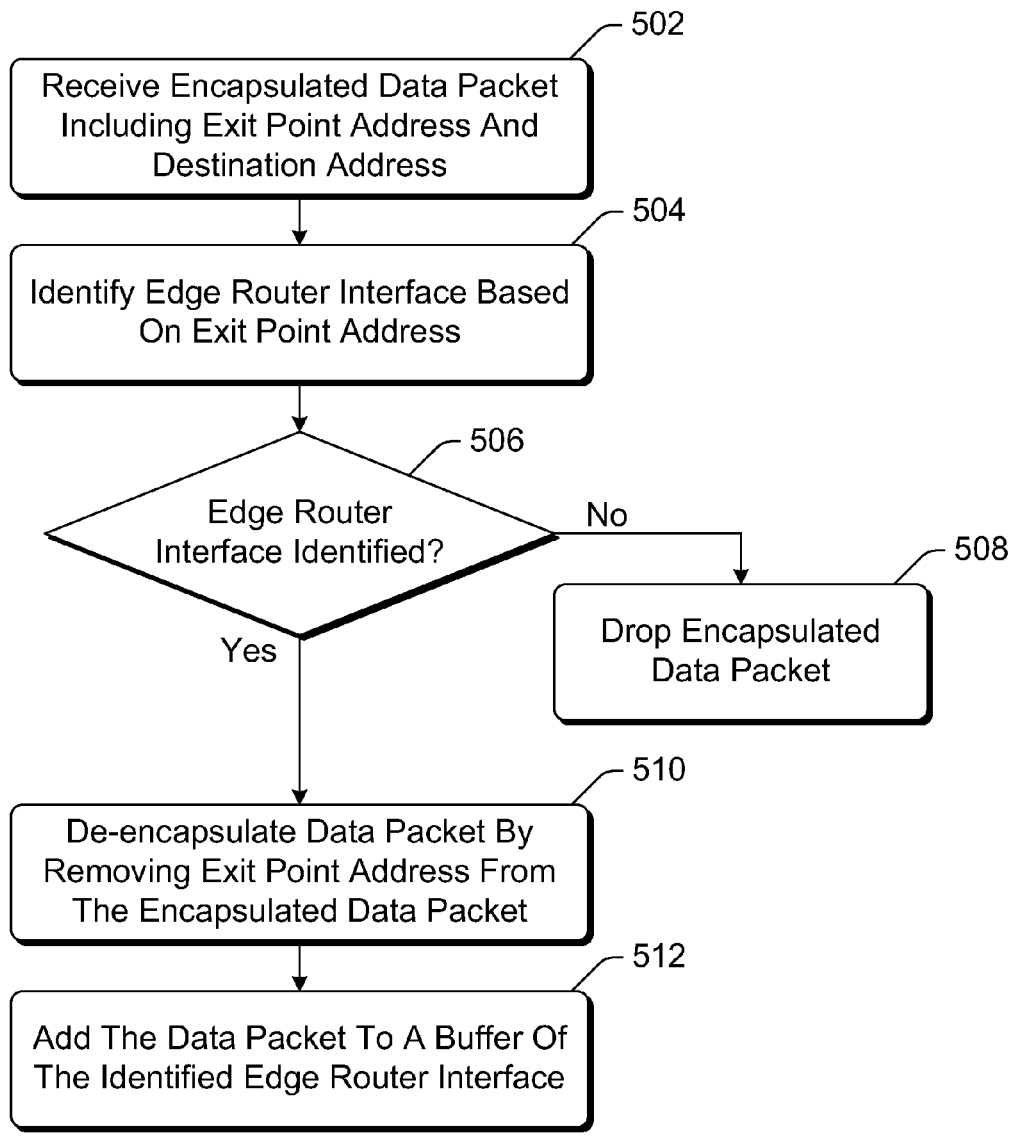
FIG. 5 is a flowchart illustrating an example process for an edge router implementing the backbone network with policy driven routing in accordance with one or more embodiments.

FIG. 5 is a flowchart illustrating an example process 500 for an edge router implementing the backbone network with policy driven routing in accordance with one or more embodiments. Process 500 is carried out by an edge router, such as an edge router 106 of FIG. 1 or an edge router 210 of FIG. 2, and can be implemented in software, firmware, hardware, or combinations thereof. Process 500 is shown as a set of acts and is not limited to the order shown for performing the operations of the various acts. Process 500 is an example process for an edge router implementing the backbone network with policy driven routing; additional discussions of an edge router implementing the backbone network with policy driven routing are included herein with reference to different figures.

In process 500, an encapsulated data packet is received (act 502). The encapsulated data packet includes an exit point address, a destination address, and a payload as discussed above.

An interface of the edge router is identified based on the exit point address in the encapsulated data packet (act 504). The identified edge router interface is the interface of the edge router implementing process 500 that corresponds to the exit point address.

The identification of the interface of the edge router may or may not be successful, as discussed above. Accordingly, process 500 proceeds based on whether an edge router interface is identified (act 506). If the edge router interface is not identified, then the encapsulated data packet is dropped (act 508). By dropping the encapsulated data packet, the edge router can delete or otherwise ignore the encapsulated data packet.

However, if the edge router interface is identified, then the encapsulated data packet is de-encapsulated by removing the exit point address from the encapsulated data packet (act 510). This exit point address is removed from the encapsulated data packet by, for example, removing from the encapsulated data packet the outer header that includes the exit point address. This removal of the exit point address from the encapsulated data packet is also referred to as de-encapsulating the data packet.

The data packet is added to a buffer of the edge router interface (act 512). The data packet is added to the buffer that corresponds to the edge router interface identified in act 504. As discussed above, the exit point address can be removed from the encapsulated data packet before or after the data packet is added to the buffer of the edge router interface.

Figure 6:
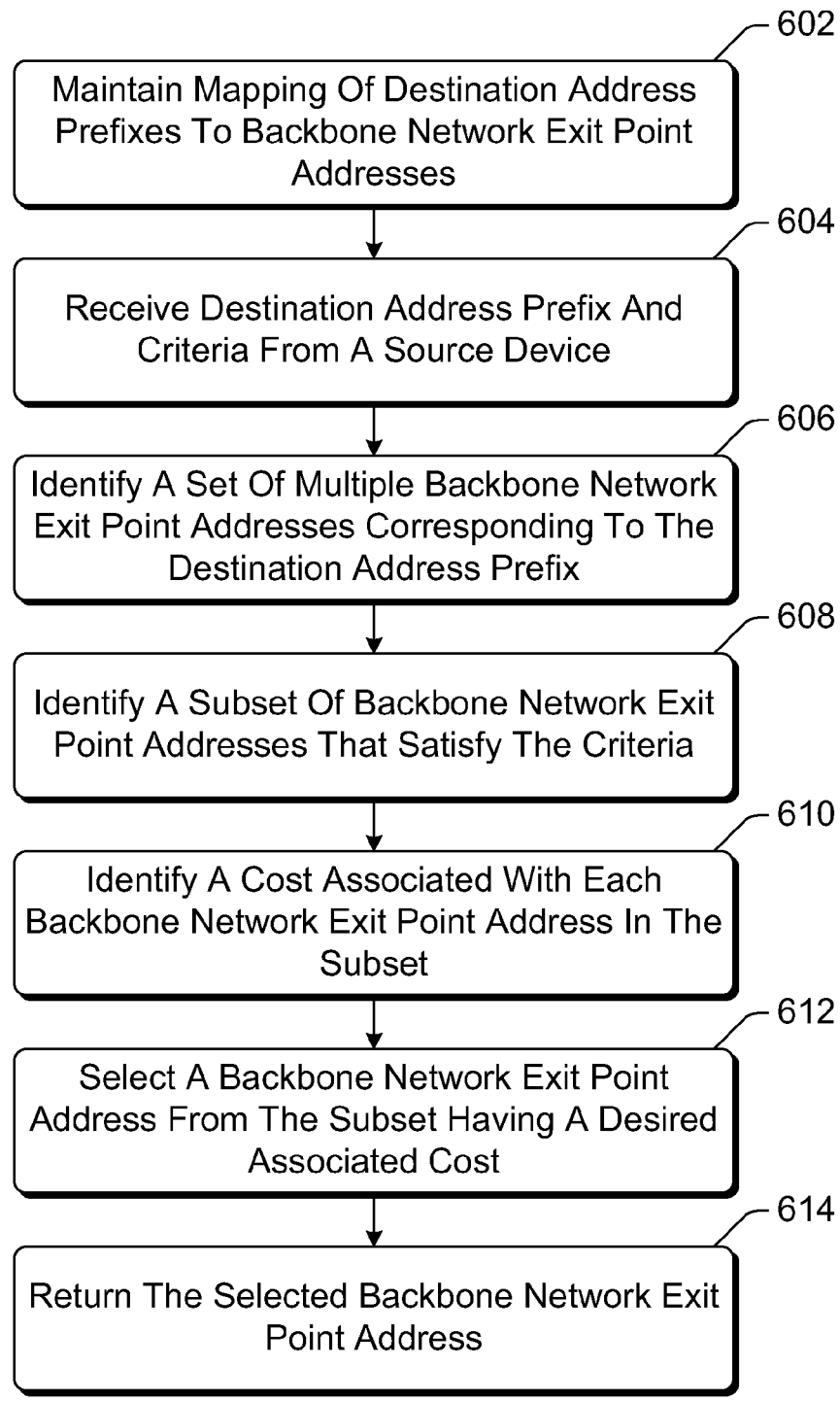
FIG. 6 is a flowchart illustrating an example process for a controller device implementing the backbone network with policy driven routing in accordance with one or more embodiments.

FIG. 6 is a flowchart illustrating an example process 600 for a controller device implementing the backbone network with policy driven routing in accordance with one or more embodiments. Process 600 is carried out by a controller device, such as a controller device 116 of FIG. 1 or a controller device 204 of FIG. 2, and can be implemented in software, firmware, hardware, or combinations thereof. Process 600 is shown as a set of acts and is not limited to the order shown for performing the operations of the various acts. Process 600 is an example process for a controller device implementing the backbone network with policy driven routing; additional discussions of a controller device implementing the backbone network with policy driven routing are included herein with reference to different figures.

In process 600, a mapping of destination address prefixes to backbone network exit point addresses is maintained (act 602). Which destination addresses correspond to which backbone network exit point address can be identified in different manners as discussed above.

A destination address prefix and criteria are received from the source device (act 604). A variety of different criteria can be received from the source device, as discussed above. Additionally, at least the destination address prefix is received from the source device, although additional parts of the destination address can be received as well (e.g., the entire destination address can be received).

A set of multiple backbone network exit point addresses corresponding to the destination address prefix is identified (act 606). This set of multiple backbone network exit point addresses is identified based on the mapping of destination address prefixes to backbone network exit point addresses as discussed above.

A subset of backbone network exit point addresses that satisfy the received criteria are identified (act 608). This subset is a subset of the set of backbone network exit point addresses identified in act 606. A particular backbone network exit point address satisfies the received criteria if the backbone network exit point having that particular backbone network exit point address satisfies the received criteria.

A cost associated with each backbone network exit point address in the subset of backbone network exit point addresses is identified (act 610). This cost associated with a particular backbone network exit point address is a cost of using the exit point having that particular backbone network exit point addresses as discussed above.

A backbone network exit point address having the desired (e.g., lowest) associated cost is selected from the subset of backbone network exit point addresses (act 612). The backbone network exit point address having the lowest cost is the backbone network exit point address associated with the exit point having the lowest cost.

The backbone network exit point address selected in act 612 is returned to the source device from which the request was received (act 614). Alternatively, one or more additional backup backbone network exit point addresses can also be returned to the source device as discussed above.

Figure 7:
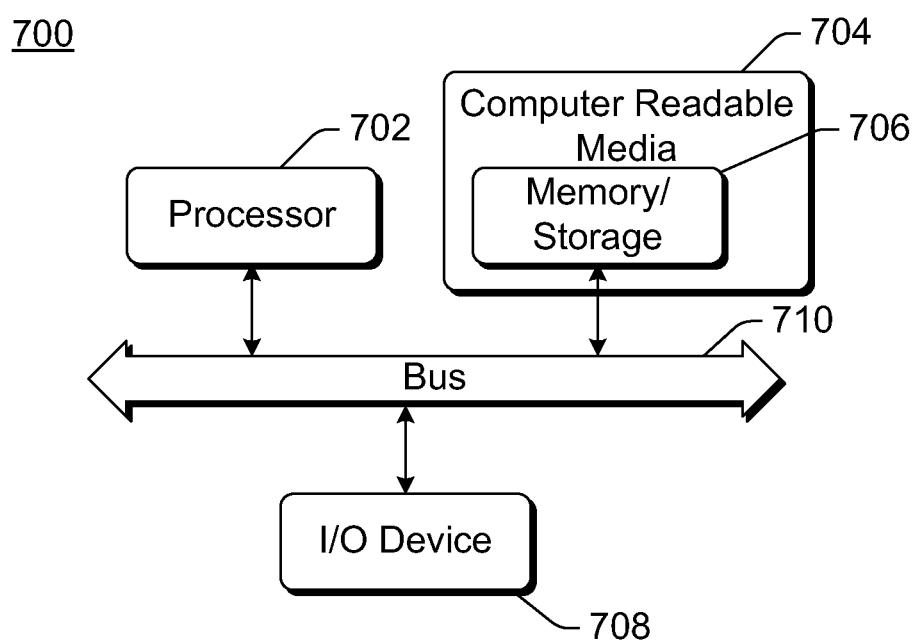
FIG. 7 illustrates an example computing device that can be configured to implement the backbone network with policy driven routing in accordance with one or more embodiments.

FIG. 7 illustrates an example computing device 700 that can be configured to implement the backbone network with policy driven routing in accordance with one or more embodiments. Computing device 700 can be, for example, a router 104, 106, or 108, or device 110, 114, or 116 of FIG. 1. Computing device 700 can also be, for example, a device 202, 204, or 206, or router 208 or 210 of FIG. 2. Computing device 700 can be a variety of different types of devices, such as a server computer, desktop computer, a netbook or laptop computer, a notepad or tablet computer, a mobile station, an entertainment appliance, a set-top box communicatively coupled to a display device, a television, a cellular or other wireless phone, a game console, an automotive computer, a router, a gateway, and so forth.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the backbone network with policy driven routing techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a device, the method comprising:
    obtaining a data packet that includes both a destination address and a payload;
    identifying a first exit point address of multiple exit point addresses corresponding to the destination address, each of the multiple exit point addresses identifying one or more interfaces of one or more edge routers of a backbone network from which the data packet exits the backbone network, each of the one or more edge routers providing data packets from the backbone network to one or more other devices, the identifying including providing one or more criteria to a controller device and receiving, from the controller device, the first exit point address, the first exit point address satisfying the one or more criteria, the first exit point address being selected by the controller device based on one or more policies implemented by the controller device, the one or more policies changing over time;
    encapsulating the data packet with a first header that includes the first exit point address;
    providing the encapsulated data packet to the backbone network;
    causing, using the identified first exit point address rather than the destination address, the encapsulated data packet to route to the one or more interfaces of the one or more edge routers from which the data packet is to exit the backbone network; and
    causing the one or more edge routers to maintain a mapping of the identified first exit point address to the one or more interfaces of the one or more edge routers.

2. A method as recited in claim 1, wherein the destination address is included in a second header of the data packet.

3. A method as recited in claim 1, wherein the identifying comprises: receiving information regarding characteristics of one or more exit points associated with one or more of the multiple exit point addresses.

4. A method as recited in claim 1, wherein the first exit point address is one of multiple exit point addresses that satisfy the one or more criteria, wherein each of the multiple exit point addresses has a cost associated with using an interface associated with the exit point address and has a latency associated with using the interface associated with the exit point address, and the first exit point address is the one of the multiple exit point addresses that has both a desired cost and a desired latency.

5. A method as recited in claim 1, wherein the first exit point address is one of multiple exit point addresses that satisfy the one or more criteria, wherein each of the multiple exit point addresses has a cost associated with using an interface associated with the exit point address and has security characteristics associated with using the interface associated with the exit point address, and the first exit point address is the one of the multiple exit point addresses that has both a desired cost and desired security characteristics.

6. A method as recited in claim 1, the identifying further comprising identifying, for different applications on the device, different exit point addresses of the multiple exit point addresses for the same destination address.

7. A method as recited in claim 1, further comprising identifying a second exit point address, and encapsulating the data packet with a header that includes the second exit point address rather than the first header if sending the data packet with the first header is unsuccessful.

8. A method as recited in claim 1, further comprising identifying a second exit point address, and including both the first exit point address and the second exit point address in the first header.

9. A method as recited in claim 1, wherein the first exit point address and the destination address are both Internet Protocol (IP) addresses.

10. One or more computer storage memories having stored thereon multiple instructions that, when executed by one or more processors of a device, cause the one or more processors to:
    obtain a data packet that includes both a destination address and a payload;
    identify an exit point address of multiple exit point addresses that correspond to the destination address, each of the multiple exit point addresses identifying one or more interfaces of multiple edge routers of a backbone network from which the data packet exits the backbone network, each of the multiple edge routers providing data packets from the backbone network to one or more other devices, to identify the exit point address includes to provide one or more criteria to a controller device and to receive, from the controller device, the exit point address, the exit point address satisfying the one or more criteria, the exit point address being selected by the controller device based on one or more policies implemented by the controller device, the one or more policies changing over time;
    encapsulate the data packet with a header that includes the exit point address;
    provide the encapsulated data packet to the backbone network;
    cause, using the identified exit point address rather than the destination address, the encapsulated data packet to route to the one or more interfaces of the multiple edge routers from which the data packet is to exit the backbone network; and cause the multiple edge routers to maintain a mapping of the identified exit point address to the one or more interfaces of the multiple edge routers.

11. One or more computer storage memories as recited in claim 10, the destination address being included in an additional header of the data packet.

12. One or more computer storage memories as recited in claim 10, wherein to identify the exit point address is to:

receive information regarding characteristics of one or more exit points associated with one or more of the multiple exit point addresses; and select, based at least in part on the received information, one of the multiple exit point addresses.

13. One or more computer storage memories as recited in claim 10, wherein the exit point address is one of multiple exit point addresses that satisfy the one or more criteria, wherein each of the multiple exit point addresses has an associated interface and has a latency associated with using the associated interface, and the exit point address is one of the multiple exit point addresses that has a desired latency.

14. One or more computer storage memories as recited in claim 10, wherein the exit point address is one of multiple exit point addresses that satisfy the one or more criteria, wherein each of the multiple exit point addresses has an associated interface and has security characteristics associated with using the associated interface, and the exit point address is one of the multiple exit point addresses that has desired security characteristics.

15. One or more computer storage memories as recited in claim 10, wherein the exit point address is one of multiple exit point addresses that satisfy the one or more criteria, wherein each of the multiple exit point addresses has an associated interface and has a cost associated with using the associated interface, and the exit point address is one of the multiple exit point addresses that has a desired cost.

16. A method as recited in claim 1, further comprising, prior to exiting the backbone network, removing the first exit point address from the first header of the encapsulating the data packet.

17. A system comprising:

one or more processors;

one or more memories having stored thereon multiple instructions that, when executed by the one or more processors, cause the one or more processors to:

obtain a data packet that includes both a destination address and a payload;

identify an exit point address of multiple exit point addresses that correspond to the destination address, each of the multiple exit point addresses identifying one or more interfaces of multiple edge routers of a backbone network from which the data packet exits the backbone network, each of the multiple edge routers providing data packets from the backbone network to one or more other devices, to identify the exit point address includes to provide one or more criteria to a controller device and to receive, from the controller device, the exit point address, the exit point address satisfying the one or more criteria, the exit point address being selected by the controller device based on one or more policies implemented by the controller device, the one or more policies changing over time;

encapsulate the data packet with a header that includes the exit point address;

provide the encapsulated data packet to the backbone network;

cause, using the identified exit point address rather than the destination address, the encapsulated data packet to route to the one or more interfaces of the multiple edge routers from which the data packet is to exit the backbone network; and cause the multiple edge routers to maintain a mapping of the identified exit point address to the one or more interfaces of the multiple edge routers.

18. A system as recited in claim 17, wherein the destination address is an Internet Protocol (IP) address.

19. A system as recited in claim 17, wherein the exit point address corresponds to multiple different destination addresses.

20. A system as recited in claim 17, wherein the exit point address corresponds to a prefix of the destination address.

* * * * *